Feb. 18, 1930.   O. T. NICHOL   1,747,730
TRACTOR GUIDE
Filed Nov. 10, 1928   3 Sheets-Sheet 1
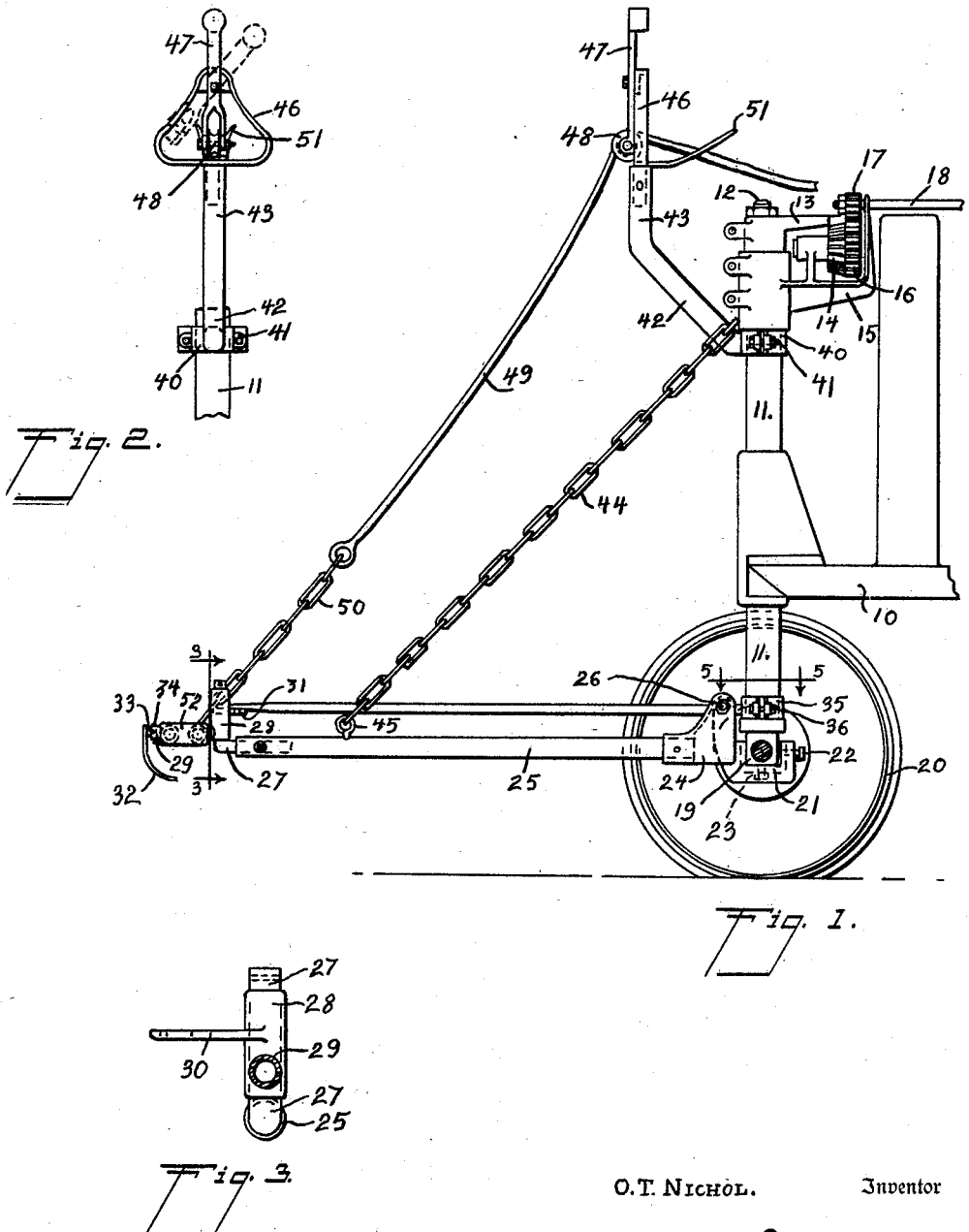
O. T. NICHOL.   Inventor
By David O. Darnell
Attorney

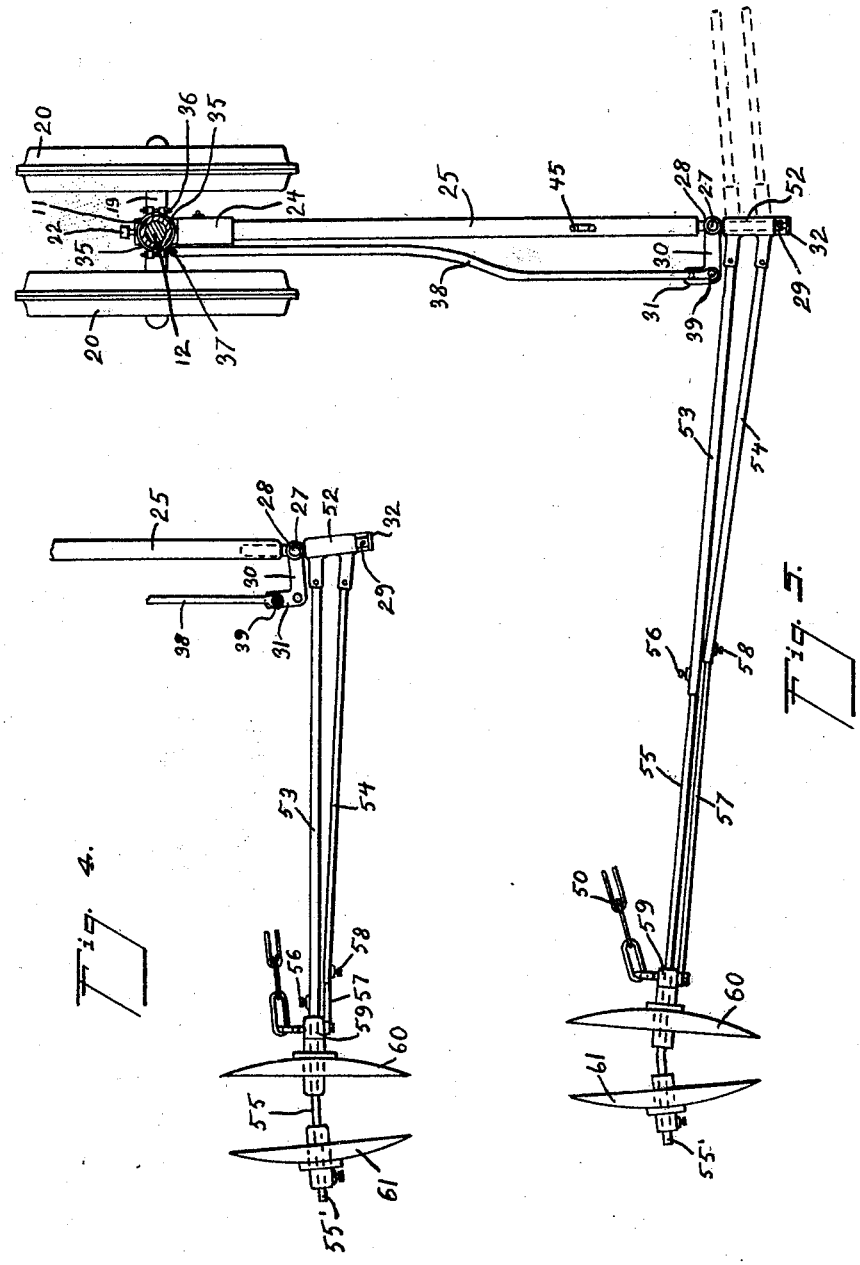

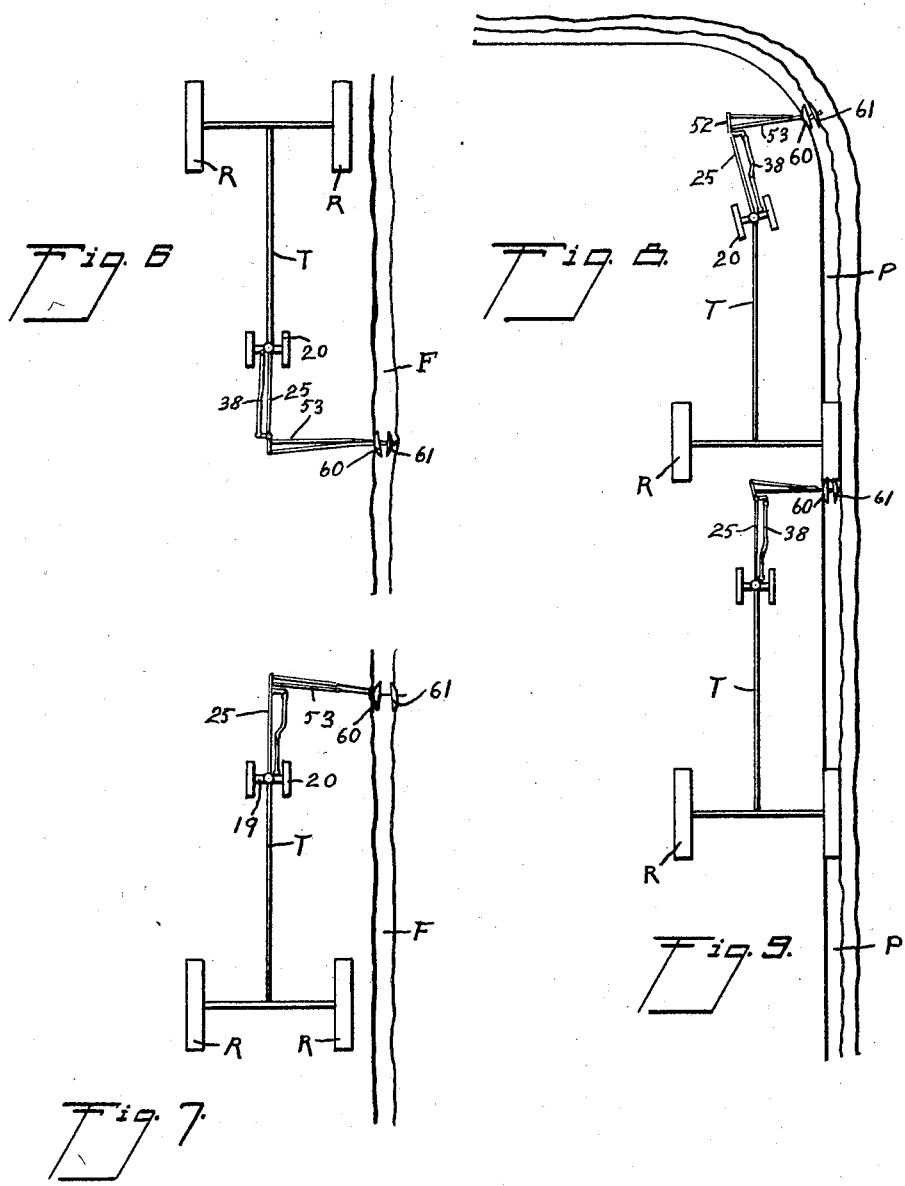

Patented Feb. 18, 1930

1,747,730

UNITED STATES PATENT OFFICE

ORR T. NICHOL, OF OMAHA, NEBRASKA, ASSIGNOR TO NICHOL MANUFACTURING COMPANY, A CORPORATION OF NEBRASKA

TRACTOR GUIDE

Application filed November 10, 1928. Serial No. 318,423.

My invention relates to automatic guiding attachments for tractors of the class in which the manual steering of the vehicle is effected by turning about a vertical axis a narrow front truck disposed centrally of the forward portion of the tractor-frame. It is the object of my invention to provide for tractors of this class a simple, inexpensive, durable and efficient automatic guiding device, for use with the tractor when the same is employed for propelling plows, cultivators, listers, and other agricultural implements which produce furrows, or which are used upon ground having furrows or ridges which may be engaged by pilot-members to operate the guiding means. A further object of my invention is to provide, for tractors of this class, an automatic guiding attachment which may be quickly and easily applied to and removed from the tractor. A further object is to provide an automatic guiding attachment in which the spacing of the pilot-members laterally of the line of travel of the tractor may be readily varied to adapt the same for the various purposes for which the tractor is used; and in which the pilot-members may be reversed or changed from one side of the line of travel to the other, without requiring the operator to dismount from the seat of the tractor. A further object is to provide, in a tractor guide of this class employing a pair of pilot-wheels arranged in convergent planes, means for varying the angular relations of the pilot-wheels to the guiding furrow, whereby the planes of the wheels may be either symmetrical to the furrow, or so disposed that one of the wheels is parallel with the sides of the furrow. A further object is to provide an automatic steering attachment wherein the mechanism which operatively connects the pilot-wheels and the tractor-steering wheels is so constructed and arranged that curvature of the guiding furrow will cause the pilot-wheels to assume an angular relation to the tractor-frame different from and intermediate those of the front and rear axles of the tractor, whereby to dispose said pilot-wheels in the most advantageous relation to the curved portion of the furrow, and reducing to a minimum the possibility of the pilot-wheels being thrown out of the furrow while traversing a curved portion thereof.

In the accompanying drawings Fig. 1 is a side elevation of a guide attachment embodying my invention, showing the portions of the tractor to which the guide mechanism is applied, Fig. 2 is a detail front view of the hoist-bracket and hoist-cable guide, Fig. 3 is a detail vertical section on the line 3—3 of Fig. 1, showing the pilot-head, Fig. 4 is a partial plan view of the guide mechanism, showing the pilot-wheels in plowing position, Fig. 5 is a plan view of the guide mechanism and the steering-truck of the tractor, the steering-post and column being in horizontal section on the line 5—5 of Fig. 1, Figs. 6 and 7 are diagrammatic plan views showing the relations of the tractor-wheels, the guide mechanism, and the guiding furrow when the tractor is used for listing, and Figs. 8 and 9 are diagrammatic plan views showing typical relations of the tractor-wheels, the guide mechanism and the guiding furrow, when the tractor is used for plowing.

Tractors of the class with which my guiding attachment is adapted for use are provided, at the front central portion of the frame 10 thereof, with a tubular fixed column 11 through which extends the vertical steering-post 12. Said steering-post is connected at its upper end with suitable means for turning the same, under manual control. In the structure illustrated in Fig. 1 said manually controlled means comprise a bevel gear segment 13 secured to the upper end of the post 12, a bevel gear 14 meshing with said segment and carried on a horizontal shaft mounted revolubly in a bracket 15 secured to the column 11, a gear 16 carried on the same shaft with the bevel gear 14, a pinion 17 meshing with said gear 16, and a horizontal shaft 18 extending rearwardly to a point near the operator's seat, said shaft having at its rear end a wheel or other means (not shown) by which the operator may turn the shaft to rotate the pinion. The lower end of the steering-post 12 is connected fixedly with the short horizontal axle 19 of the steering-truck, which comprises merely said axle and a pair of flanged wheels 20 mounted revolubly upon the end portions of the axle.

In the preferred embodiment of my invention I provide a U-shaped clamp-member 21 adapted to fit loosely about the lower side of the axle 19 at the center thereof, said member having at the rear side thereof a set-screw 22 adapted to engage the rear side of the axle, and there being a screw 23 (indicated in Fig. 1 by dotted lines only) passing through the lower side of the clamp-member to secure the same to the axle. The front portion of the clamp-member has formed integrally therewith a flat lug or hinge-member which extends up in front of the lowermost portion of the column 11, to fit within or between the parallel side-portions of a box-head 24 secured on the rear end of the guide-tongue 25. A pivot-bolt 26, extending transversely through the upper portions of the head and hinge-lug, connects the tongue and clamp-member so as to permit movement of the tongue about said pivot in a vertical plane only, while the side portions of the head fit about the hinge-lug to maintain lateral rigidity of the connection. The tongue 25 is preferably tubular, and into the front end thereof is inserted and fixedly secured the horizontal portion of an L-shaped bar 27 of which the front portion extends vertically. The pilot-head is mounted pivotally upon the vertical front portion of the bar 27, said pilot-head comprising a vertical tubular portion 28 fitting rotatably upon the bar 27, a tubular horizontal arm 29 extending forwardly from the lower end of the vertical portion 28, and a flat arm 30 extending laterally from the vertical portion 28, said arm 30 being substantially at right angles to the arm 29 in horizontal projection, and the outer end of the arm 30 having a rearwardly extending lug 31. At the front end of the pilot-head a guard-plate 32 is mounted thereon by means of a stem 33 affixed to the plate and inserted in the end of the tubular arm 29, said stem being removably secured in said tubular arm by a cotter-pin 34 extending transversely through the parts, the guard-plate being thus retained in the relation to the pilot-head indicated in Fig. 1.

A split collar 35 is disposed about the frame-column 11 near the lower end thereof, said collar being clamped upon the column by suitable bolts 36 so as to be firmly held thereon. Affixed to and projecting diagonally forward from the lower portion of said collar 35 is a finger 37 of which the end portion is turned to extend up vertically adjacent to the side of the collar. On said vertical portion of the finger 37 is fitted pivotally the rear end of the connecting-rod 38 which extends forwardly therefrom alongside the tongue 25 and has the front end thereof connected pivotally with the lateral arm 30 of the pilot-head. Said arm 30 has two holes therein for receiving the pivot-bolt 39 by which the rod is connected therewith, one of the holes being in the lug 31 and the other forwardly thereof but at substantially the same radial distance from the vertical pivotal axis of the pilot-head. The parts are so proportioned that when the guide-tongue is in its normal position of longitudinal alinement with the tractor-frame, and the pivot-bolt 39 is engaged in the front hole in the arm 30, the front arm 29 of the pilot-head will be alined longitudinally with the tongue 25, as shown in Fig. 5; and when the pivot-bolt 39 is engaged in the rear hole of the arm 30, as shown in Fig. 4, the arm 29 is thrown out of alinement with the tongue, the pilot-head being swung toward the side opposite the arm 30, or to the left as shown in said Fig. 4. It should be noted also that the radial length of the arm 30, from the pivot-bolt 39 to the vertical axis of the pilot-head, is greater than the lateral distance from the longitudinal center of the tongue 25 to the finger 37 with which the rear end of the rod 38 is connected. It will be obvious that if these dimensions were equal, the guide-tongue and the connecting-rod 38 would constitute a parallel-bar couple, such that if the tongue should be swung laterally from its normal position shown in Fig. 5, the connecting-rod 38 would cause a compensatory pivotal movement of the pilot-head by which the front arm 29 would be kept parallel with the longitudinal axis of the tractor-frame. By the described asymmetry of the distances between the pivotally connected ends of the tongue and rod 38, however, the front arm of the pilot-head is caused to be swung laterally in the same direction as the tongue, but to a lesser angle with the longitudinal axis of the tractor-frame, for a purpose which will presently appear.

On the frame-column 11 immediately beneath the gear-bracket 15 is disposed a split collar 40 which is clamped fixedly to the column by suitable bolts 41 connecting the halves of the collar as shown. Formed integrally with the front portion of said collar 40 is the hoist-bracket which comprises an arm 42 extending diagonally upward and forward from the collar, and a tubular arm 43 extending vertically from the end of the diagonal arm. A chain 44 is connected with an eye 45 on the guide-tongue near the front end thereof, the chain extending from said eye diagonally upward and rearward, and the rear end portion of the chain being looped about the diagonal arm 42 to support the tongue normally in a substantially horizontal plane, as shown in Fig. 1. On the upper end of the arm 43 is mounted the hoist-head which comprises an approximately triangular open frame 46 having pivotally mounted on the upper end thereof the counterbalanced laterally swingable arm 47, the lower portion of said arm 47 being forked to receive the sheave or pulley 48. A flexible hoisting member such as a rope or cable 49 is extended from a point accessible to the operator of the tractor, passing over the pulley 48 and thence to the vertically swingable pilot-beam which carries the pilot-wheels as hereinafter described. The terminal portion of the flexible hoisting member is preferably formed by a chain 50, and a V-slotted plate 51 is extended rearwardly from the lower portion of the hoist-head, so that when the chain is drawn up and over the pulley 48 a link of the chain may be detachably engaged with the plate 51 by dropping the chain through the V-slot, in a manner which will be obvious. By swinging of the counterbalanced arm 47 about its pivotal axis, as indicated by dotted lines in Fig. 2, the axis of the pulley 48 may remain constantly at right angles to the plane of the flexible hoisting member.

The pilot-beam, above referred to, has a tubular sleeve 52 which fits rotatably upon the front arm 29 of the pilot-head, being retained thereon by the guard-plate 32, and two tubular arms 53 and 54 extend laterally from said sleeve 52, said arms being slightly convergent toward their outer ends, and both arms being somewhat inclined rearwardly from a plane transverse to the axis of the sleeve. A rod 55 fits telescopingly in the rear arm 53 so as to be adjustably extensible from the outer end thereof, said rod being held in adjusted relations to the arm by a set-screw 56. A brace-rod 57 is similarly held in adjustably extensible relations to the front arm 54, by means of a set-screw 58, the outer end of said rod 57 being secured to a collar 59 on the rod 55. The hoist-chain 50 is also secured to said collar 59. Adjacent to the collar 59 the inner pilot-wheel 60 is mounted revolubly upon the rod 55, and at a point outward of said wheel 60 the rod is bent slightly forward in a horizontal plane, to provide the terminal portion 55' on which the outer pilot-wheel 61 is similarly mounted, the arrangement being such that the planes of rotation of the wheels 60 and 61 are forwardly convergent.

When the automatic guide mechanism is used for plowing, it is desirable that the plane of rotation of the inner pilot-wheel 60 be parallel with the landside of the guiding furrow, and said wheel is caused to be disposed in this position by connecting the pivot-bolt 39 in the rear hole of the arm 30 of the pilot-head, as represented in Fig. 4. In said Fig. 4 it will be noted that the arm 53 of the pilot-beam is substantially at right angles to the tongue 25, while the front arm 29 of the pilot-head is swung slightly out of alinement with the tongue, as hereinbefore noted. Obviously, if the pilot-beam should be reversed or swung to the opposite side of the line of travel of the tractor, while the pilot-head is in the position last above noted, the pilot-beam would be inclined rearwardly relative to the tongue 25, or in a position not symmetrical to that shown in Fig. 4. In plowing, however, the tractor is usually so operated that the guiding furrow is constantly at the right side of the machine, and it is not necessary or desirable that the pilot-beam be reversed to the left side. When forming the first furrow in "laying out" a field for plowing, or at other times when the steering of the tractor is to be effected manually, the pilot-beam is raised to an approximately vertical position by pulling upon the hoisting member 49 and engaging the chain 50 with the plate 51 to retain the beam in raised position.

When the tractor is employed for operations, such as listing, where both sides of the guiding furrow have the same form, it is preferable that the convergent planes of rotation of the pilot-wheels 60 and 61 be symmetrical to the furrow, and this relation is effected by connecting the pivot-bolt 39 in the front hole of the arm 30 of the pilot-head, as shown in Fig. 5. At this position the front arm 29 of the pilot-head is alined longitudinally with the tongue 25, so that the pilot-beam may be reversed by swinging the same from the right to the left side of the line of travel, and the beam in its reversed position (partially shown by dotted lines in Fig. 5) will be in a relation to the tongue symmetrical with that shown by full lines in said Fig. 5. By reference to Figs. 6 and 7 the use of the pilot devices at each side of the line of travel of the tractor will be clearly apparent. In said Figs. 6 and 7, and also in Figs. 8 and 9, the rear wheels R, the tractor-frame T, the front wheels 20 and axle 19 comprising the steering-truck, and the several parts of the guide mechanism, are all represented diagrammatically. In Fig. 6 the guiding furrow F is at the left side of the tractor, while in Fig. 7 the guiding furrow is at the right side of the tractor, and in each of said figures the furrow is at such a distance laterally from the center-line of the tractor as to require the lengthening of the pilot-beam by extension of the telescoping members 55 and 57. The operating conditions indicated are those usually existing when the tractor is used for listing.

Figs. 8 and 9 show diagrammatically the relation of the tractor and guide mechanism when plowing, the pilot-wheels in Fig. 9 being in a straight portion of the guiding furrow P, and in Fig. 8 the pilot-wheels being a curved portion or lateral deviation of the guiding furrow. From the latter figure it may be seen that when the pilot-wheels enter the deviating portion of the furrow the guide-tongue will be moved laterally in the direction of the furrow deviation, effecting a corresponding turning of the steering-truck of the tractor, to guide the same in conformity with the furrow-contour. It may also be seen from said Fig. 8 that the pivotal movement of the pilot-head, imparted thereto by the connecting-rod 38 as hereinbefore described, tends to keep the axes of the pilot-wheels approximately transverse to the furrow, so that there will be a minimum tendency for said wheels to be displaced from the furrow while traversing a curved portion thereof.

Now, having described my invention, what I claim and desire to secure by Letters Patent is:

1. In an automatic guiding attachment for tractors of the class having a narrow steering-truck mounted to turn about a vertical axis at the front portion of the tractor-frame, a guide-tongue extending forwardly from the central portion of the steering-truck axle, laterally rigid means for connecting said tongue and axle, a pilot-head mounted on the front portion of said tongue and swingable relatively thereto in a horizontal plane, laterally extending pilot-members mounted on said head and movable about the same in a transverse vertical plane, and a rod connected pivotally with said pilot-head and with a fixed member on the tractor-frame adjacent to the vertical axis of the steering-truck, said rod controlling the swinging movement of the pilot-head.

2. In an automatic guiding attachment for tractors of the class having a steering-truck mounted to turn about a vertical axis at the front portion of the tractor-frame, a guide-tongue extending forwardly from the central portion of the axle of the steering-truck, laterally rigid means connecting said tongue and axle, a pilot-head mounted to swing about a vertical axis at the front end of said guide-tongue, furrow-engaging pilot-members carried by said pilot-head, said pilot-head having an arm extending laterally of the guide-tongue, and a rod having one end connected pivotally with said arm and the other end connected pivotally with a fixed member adjacent to the vertical axis of the steering-truck, the pivoted ends of said connecting rod being asymmetrical to the longitudinal axis of the guide-tongue, whereby lateral swing of the guide-tongue will swing the pilot-head to a position of lesser angularity with the tractor-frame than that of the guide-tongue.

3. In an automatic guiding attachment for tractors of the class having a steering-truck mounted to turn about a vertical axis at the front portion of the tractor-frame, a guide-tongue extending forwardly from the central portion of the axle of the steering-truck, laterally rigid means connecting said tongue and axle, a pilot-head mounted on the front end of said guide-tongue and swingable laterally thereof, a pilot-beam mounted on said head and extending transversely thereof, said pilot-head having an arm extending laterally of the guide-tongue, a rod connected pivotally at its rear end with a fixed member on the tractor-frame adjoining the vertical axis of the steering-truck, and means pivotally connecting the front end of said rod selectively with spaced portions of said lateral arm of the pilot-head whereby the latter may hold the pilot-beam in different angular relations to the guide-tongue for the purposes set forth.

4. In a guiding attachment for tractors of the class having a steering-truck mounted to turn about a vertical axis at the front portion of the tractor-frame, a guide-tongue extending forwardly from the central portion of the steering-truck axle of the tractor, laterally rigid means connecting said guide-tongue with said axle, a pilot-beam, furrow-engaging means carried at one end of said pilot-beam, pivotal means connecting the other end of said pilot-beam with the front portion of the guide-tongue, said pivotal connecting means enabling swinging of the pilot-beam in a vertical plane transverse to the guide-tongue and also enabling limited swinging of the pilot-beam in a horizontal plane to vary the angular relation thereof to the guide-tongue.

5. In a guiding attachment for tractors of the class having steering means connected with the tractor-frame to turn about a vertical axis, a guide-tongue connected with said steering means, a pilot-beam normally extending laterally from the front portion of said guide-tongue, means pivotally connecting the guide-tongue and pilot-beam whereby the latter is swingable in a vertical plane transversely of the guide-tongue, a hoist-frame fixedly secured to the front portion of the tractor-frame and extending upwardly therefrom, an arm pivoted on said hoist-frame to swing in a transverse vertical plane only, a pulley carried by said arm in fixed axial relation thereto, and a flexible hoist-member connected with the pilot-beam and extending over said pulley.

6. In a guiding attachment for tractors of the class having a steering-truck mounted to turn about a vertical axis at the front portion of the tractor-frame, a clamp-member adapted to be detachably secured to the central portion of the steering-truck-axle of the tractor, a guide-tongue connected to said clamp-member in vertically swingable and laterally rigid relation thereto, means supporting said tongue in substantially horizontal position, a pilot-head pivoted on a vertical axis at the front end of said tongue, a pilot-beam connected with said pilot-head and normally extending laterally thereof, said pilot-beam having an extensible terminal member, pilot-wheels mounted revolubly upon said terminal member, said member being bent intermediate said pilot-wheels whereby the planes of rotation thereof are forwardly convergent, and connecting means between a fixed member on the tractor-frame and said pilot-head, said connecting means controlling the angular relation of the pilot-beam to the guide-tongue and being variable to dispose the pilot-wheels in selected angular relations to a guiding furrow.

7. A structure as set forth in claim 6, in which the connecting means between the tractor-frame and pilot-head is arranged asymmetrically to the guide-tongue and is proportioned to maintain substantial uniformity in the relation of the pilot-wheels to straight and curved portions of a guiding furrow.

ORR T. NICHOL.